United States Patent [19]

Oshiage et al.

[11] 4,354,378

[45] Oct. 19, 1982

[54] KNOCK DETECTING DEVICE

[75] Inventors: Katsunori Oshiage; Nobuji Manaka, both of Yokosuka, Japan

[73] Assignee: Nissan Motor Company, Ltd., Yokohama, Japan

[21] Appl. No.: 141,599

[22] Filed: Apr. 18, 1980

[30] Foreign Application Priority Data

Apr. 21, 1979 [JP] Japan ............................. 54/49468

[51] Int. Cl.³ ............................................ G01L 23/22
[52] U.S. Cl. .......................................... 73/35; 123/425
[58] Field of Search ............................ 73/35; 123/425

[56] References Cited

U.S. PATENT DOCUMENTS

| 3,950,981 | 4/1976 | Arrigioni et al. | 73/35 |
| 4,002,155 | 1/1977 | Harned | 73/35 X |
| 4,240,388 | 12/1980 | Omori et al. | 123/425 |
| 4,243,008 | 1/1981 | Omori et al. | 123/425 |

Primary Examiner—James J. Gill
Attorney, Agent, or Firm—Schwartz, Jeffery, Schwaab, Mack, Blumenthal & Koch

[57] ABSTRACT

A knock detecting device for modifying the ignition timing of individual cylinders of an engine, by using averaging circuits which are the same in number as the cylinders, a first distributing switch that distributes the output from a sensor detecting engine vibration to said averaging circuits, a second distributing switch selecting the outputs from the averaging circuits, a detecting means detecting the presence of knocking at each cylinder through comparison of the output from the sensor and the selected output from the averaging circuits, and a control means controlling the ignition timing of the individual cylinders in response to the output from the detecting means.

7 Claims, 3 Drawing Figures

KNOCK DETECTING DEVICE

BACKGROUND OF THE INVENTION

1. Field of the Invention

The present invention relates to a device for producing signals accurately representing knocking at individual cylinders of an engine, for effecting feedback control of ignition timing thereof in response to the knocking conditions as represented by the signals.

2. Description of the Prior Art

It is known that when excessive knocking is sustained, adverse influences such as a deterioration of engine durability are caused, while a slight knocking state in a comparatively slow range of the engine revolving speed is favorable for optimization of the engine output and fuel cost characteristics. The occurrence of the knocking has a significant correlation with the timing of ignition, and advancement of the ignition timing generally tends to enhance the occurrence of the knocking.

Accordingly, systems which detect the knocking of an engine in order to advance or retard the ignition timing in response to the knocking thus detected, for optimizing the fuel cost and the output characteristics of the engine by allowing slight knocking therein, have been known. A device for detecting the knocking state in the aforesaid systems of the prior art includes a vibratory sensor (an acceleration sensor) adapted to be mounted on an engine body, and the output signal from the sensor is once passed through a band-pass filter for extracting only the knocking frequency band vibratory component, so as to determine the knocking state on the basis of output signals from the band-pass filter.

The conventional knocking detecting device of the aforesaid construction has a shortcoming in that only one vibratory sensor is used and the location of the sensor mount is not necessarily consistent with respect to the individual cylinders of the engine, so that the vibratory level which is recognized by the sensor as knocking varies from cylinder to cylinder, and the accuracy of the device in determining the state of knocking is low.

More particularly, the signals from the vibratory sensor or knock sensor are directly averaged by an averaging circuit having a comparatively large time constant for producing a reference voltage for detecting the knocking, which reference voltage is used for determining the knocking at any of the cylinders of the engine. Thus, at a cylinder where the engine vibration is easily transmitted to the knock sensor, absence of knocking may be falsely judged as presence or occurrence of knocking, and inversely, at a cylinder where the engine vibration is hardly transmittable to the sensor, the presence of the knocking may be falsely judged as the absence of it. Consequently, the detection of the knocking state in the conventional device has been inaccurate.

SUMMARY OF THE INVENTION

The present invention obviates the aforesaid shortcomings of the device of the prior art. According to the present invention, a reference signal for detecting a state of knocking is separately produced for each cylinder, and the state of knocking is determined cylinder by cylinder based on the reference signal thus produced, and on the basis of the state of knocking thus determined, optimal ignition timing control is independently effected for each cylinder.

BRIEF DESCRIPTION OF THE DRAWING

For a better understanding of the invention, reference is made to the accompanying drawing, in which.

Like parts are designated by like numerals and symbols throughout different views of the drawing.

DESCRIPTION OF THE PREFERRED EMBODIMENT

Figure 1:
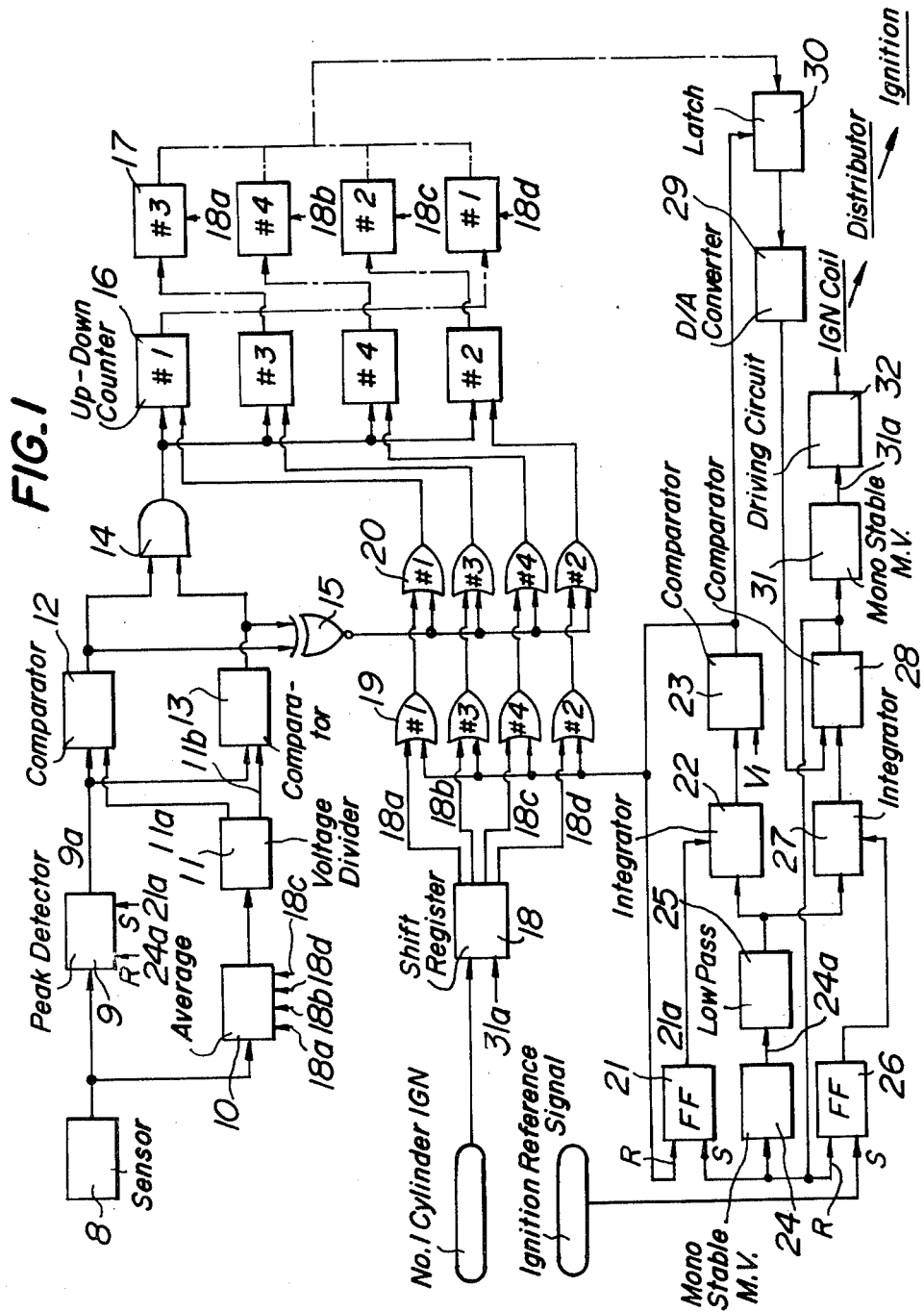
FIG. 1 is a block diagram of an embodiment of the present invention.

In an embodiment of the present invention as shown in FIG. 1, a state of knocking in each of various cylinders (cylinders No. 1 through No. 4) is separately detected, and the ignition timing is separately controlled for each cylinder based on the knocking state of the related cylinder thus detected. Ignition reference signals as a reference for ignition timing are generated by the contact point or pickup of a distributor, which distributor has a negative-pressure advance mechanism and a governor advance mechanism, for facilitating optimal ignition timing at different loads and revolving speeds of an engine. The ignition is normally effected in synchronism with the ignition reference signals, and the ignition timing is retarded at each cylinder upon the occurrence of knocking depending on the state of the knocking detected. When a microcomputer is used, the ignition reference signal can be stored in a memory.

In FIG. 1, 8 is a vibratory sensor, which for instance comprises a vibrator of a predetermined mass elastically supported in the body of the sensor by a spring and an element for converting the vibration of the vibrator into an electric signal. To efficiently extract only the vibration due to knocking without using any band-pass filter, its resonant frequency is set in the knocking frequency range, so that the sensor 8 is of resonant vibration type.

The sequence of cylinders to be ignited in the embodiment of the invention of FIG. 1 is assumed to be No. 1, No. 3, No. 4, and then No. 2.

Now, if the cylinder No. 1 is ignited, of all the components of the engine vibration ensuing from the ignition, the vibration components in the knocking frequency range are detected by the aforesaid resonant vibratory sensor 8. The signal detected by the sensor 8 is applied to a peak detector 9 and an average value circuit 10.

To avoid noise caused by the ignition, the peak detector 9 is reset for a given period by a monostable multivibrator 24 which produces an output signal in synchronism with the ignition signal (in fact, the output signals from a comparator 28) for the given period. The detector 9 samples the peak values of the detected signals from the aforesaid resonant vibratory sensor 8 for a period inversely proportional to the revolving speed of the engine, in response to the signal from a flip-flop 21. The peak value thus detected is then held until the time of ignition of the succeeding cylinder (cylinder No. 3). This arrangement is for sampling only the peak values of the knocking vibration occurring immediately after firing, and for avoiding sampling of peak values of other vibrations thereafter such as vibrations due to combustion and vibrations due to cams and valves.

Figure 2:
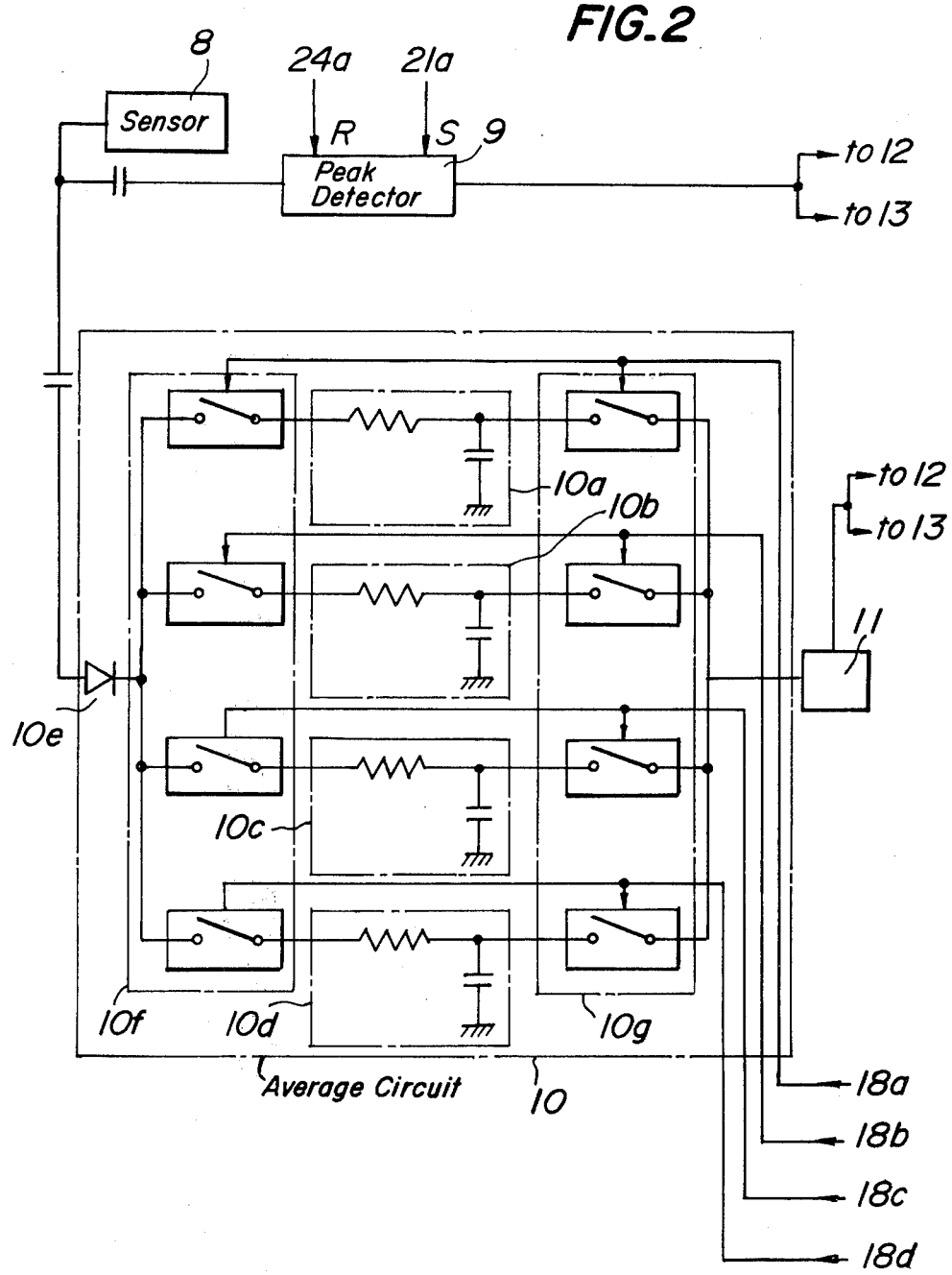
FIG. 2 is a block diagram showing the details of an averaging circuit in the embodiment of FIG. 1.

On the other hand, the average value circuit 10 averages the signal from the resonant type vibratory sensor 8 for each cylinder separately in the sequence of ignition, and produces four average signals as output signals thereof, which output signals are sequentially applied to a voltage divider 11 in synchronism with the ignition signals. As shown in FIG. 2, the average value circuit 10 for instance comprises a rectifier 10e, which rectifier rectifies and detects signals from the sensor 8; low-pass filters 10a, 10b, 10c, and 10d corresponding to the individual cylinders, each of said filters having a time constant of about 0.5 second; and distributing switches 10f and 10g.

Figure 3:
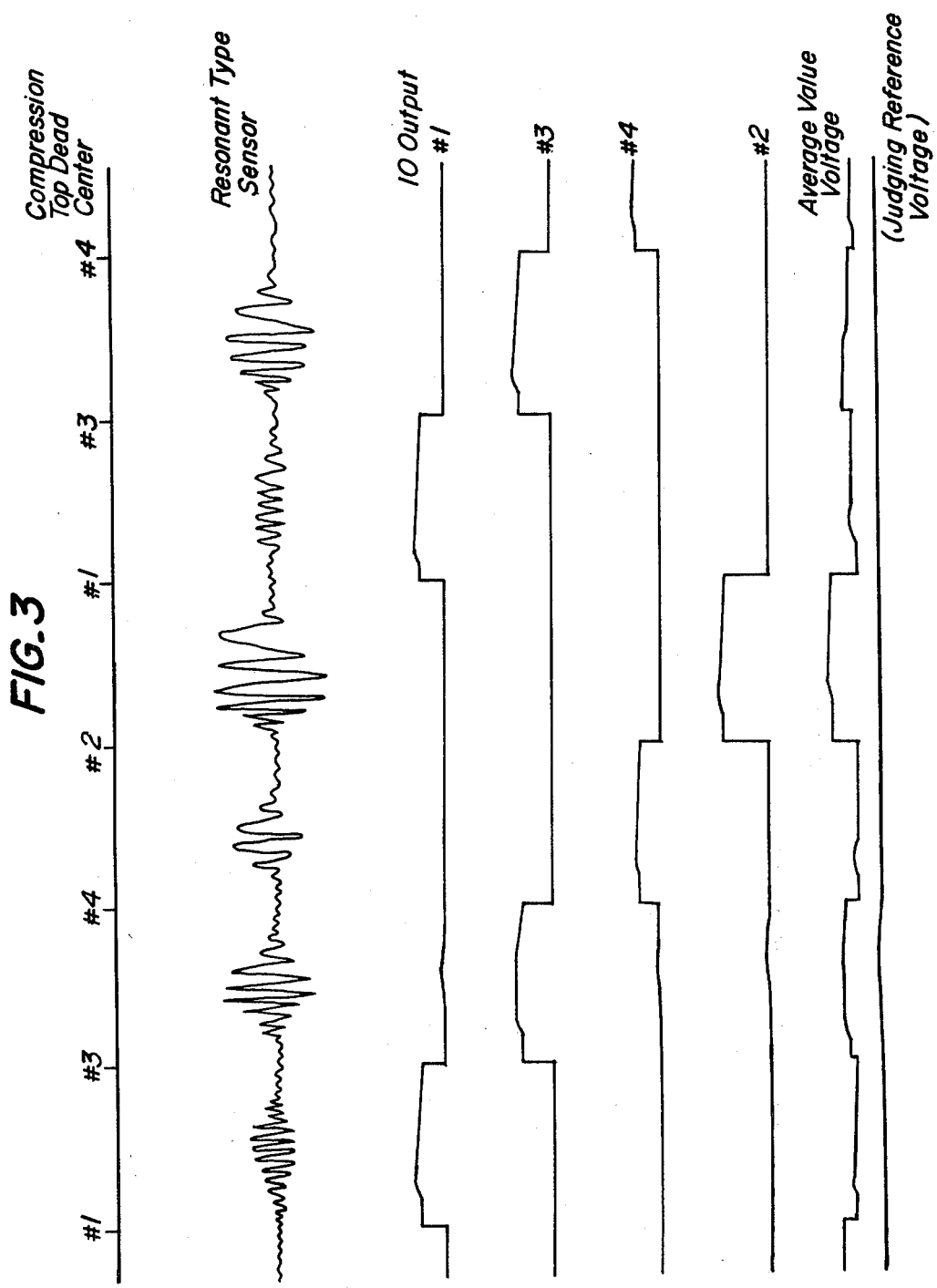
FIG. 3 is a time chart showing relationships among different signals.

The distributing switch 10f channels the rectified signals from the sensor 8 sequentially to the low-pass filters 10a through 10d, in response to pulses from a shift register 18 (details of which will be described hereinafter) in synchronism with the ignition signals, which shift register determines the cylinder just ignited. For instance, the signal at the time of the ignition of the cylinder No. 1 is delivered to the low-pass filter 10a, the signal at the ignition of the cylinder No. 3 is delivered to the filter 10b, the signal at the ignition of the cylinder No. 4 is applied to the filter 10c, and the signal at the ignition of the cylinder No. 2 is applied to the filter 10d. (see the time chart of FIG. 3)

The filters 10a through 10d average the rectified signals from the sensor 8, which signals correspond to the individual cylinders, so as to produce signals representing the background noise at each of the individual cylinders of the engine.

In general, the position of the sensor 8 relative to the different cylinders is not equivalent, so that the background noises at the individual cylinders are usually different from each other. The present invention produces the signals representing the background noises of each of the individual cylinders separately, which background noises are the bases for judging the presence of knocking. Thus feedback control of the ignition timing can be very accurately effected for each cylinder independently.

The distributing switch 10g sequentially applies the background noise signals of different cylinders to the voltage divider 11 in synchronism with the ignition signals, in a manner similar to that of the distributing switch 10f. (see the time chart of FIG. 3). The voltage divider 11 divides the voltage of the background noise signal, so as to prepare two reference signals 11a (high-level) and 11b (low-level) as criteria for comparison of the magnitude of the peak value of the knocking vibration, which reference signals are applied to a comparator 12 and a comparator 13, respectively.

The comparator 12 and the comparator 13 compare the peak value 9a of the knocking vibration signal as the output from the peak detector 9 against the reference signals 11a and 11b, respectively. If the peak value is larger than the reference signal, each comparator produces a high-level output signal, and a low-level output signal is produced by each comparator for the peak value smaller than the reference signal at the comparator.

The output signals from the comparators 12 and 13 are both applied to two gate circuits; namely, an AND circuit 14 and an exclusive NOR circuit 15 (i.e., a circuit producing a high-level output signal for two input signals of identical levels).

The AND circuit 14 produces a high-level output when the peak value 9a of the knocking vibration is larger than the high-level reference signal 11a, i.e., when the knocking is so strong that an increase in the retard angle from the ignition reference signal is necessary; and the AND circuit 14 produces a low-level output signal both when the aforesaid peak value 9a is between the high-level reference signal 11a and the low-level reference signal 11b and indicates slight knocking which does not require any modification of the retard angle and when the aforesaid peak value 9a is smaller than the low-level reference signal 11b and indicates the absence of knocking which requires a decrease of the retard angle.

Now, the operation of the device of the present invention will be described by taking an example during a period from the ignition of the cylinder No. 1 to the ignition of the cylinder No. 3. Let it be assumed that the peak value (9a-No. 1) of the knocking vibration of the cylinder No. 1 is larger than the high-level background noise level reference signal for the cylinder No. 1 (11a-No. 1) produced by averaging at the filter 10a, so that the AND circuit 14 produces a high-level output signal. This output signal from the AND circuit 14 becomes the input control signal for each of up-down counters 16-No. 1, 16-No. 3, 16-No. 4 and 16-No. 2 which counters determine and hold the retard angles of the ignition timing for each of the corresponding cylinders.

Each of the up-down counters up-counts the stored count thereof by one unit (stored count +1, i.e., to increase the retard angle by one step relative to the ignition reference signal) when the aforesaid control signal thereto is at high-level and a timing control pulse is applied as another input thereto; and each up-down counter down-counts the stored count thereof by one unit (stored count −1, i.e., to decrease the retard angle by one step relative to the ignition reference signal) when the aforesaid control signal thereto is at low-level and a timing control pulse is applied as another input thereto. The stored count in the up-down counters never assumes any negative value. When no timing control pulse is applied to the up-down counter, the stored count thereof is retained intact regardless of the level of the aforesaid control signal thereto.

The exclusive NOR circuit 15 produces a low-level output signal only when the peak value 9a of the knocking vibration falls between the high-level reference signal 11a and the low-level reference signal 11b, namely only when the knocking is slight and modification of the retard angle of the ignition timing relative to the ignition reference signal is not required. The low-level output signal from the circuit 15 closes the AND gate 20, thus preventing the timing control pulse from being applied to the up-down counters 16.

Since it is assumed now that the peak value of the knocking vibration for the cylinder No. 1 (9a-No. 1) is larger than the high-level reference signal (11a-No. 1), the output signal from the exclusive NOR circuit 15 is at a high-level, so that the AND gate 20 is open.

The timing control pulse is generated by a comparator 23 after the lapse of a period inversely proportional to the number of revolutions counted from the ignition. More particularly, a signal from another comparator 28 in synchronism with the ignition signal actuates a monostable multivibrator 24, and the output signal from the vibrator 24 is applied to a low-pass filter 25 for obtaining a number of revolutions signal. Then, the number of revolution signal is integrated by an integrator 22, by setting the integrator 22 by a signal from a flip-flop 21 which flip-flop is set by the signal from the comparator 28 in synchronism with the ignition signal and reset by the signal from the comparator 23. The comparator 23 produces the timing control pulse when the output signal from the integrator 22 surpasses a certain reference voltage V1, i.e., when the period inversely proportional to the number of revolutions or revolving speed has elapsed from the ignition. Simultaneously, the flip-flop 21 is reset and the integrator 22 is also reset. As pointed out in the foregoing, the output signal from the flip-flop 21 is also used as a sampling signal at the peak detector 9.

It is necessary that the timing control pulse from the comparator 23 produced after elapse of the period inversely proportional to the number of revolutions counted from the ignition must be delivered only to that up-down counter 16 which corresponds to the cylinder ignited (which is the cylinder No. 1 under the present assumption) by detecting the ignited cylinder. To this end, a 4-bit shift register (a ring counter) 18 and an AND circuit 19 are provided.

Input signals to the shift register 18 include an ignition signal for the cylinder No. 1 from a sensor mounted on a high-tension cord for the cylinder No. 1 and a signal from another multivibrator 31 (an ignition control pulse for each cylinder). When the ignition signal for the cylinder No. 1 is applied to the shift register 18, only the first bit of the register 18 assumes high-level, and as the monostable multivibrator 31 successively applies ignition control pulse for the cylinders No. 3, No. 4 and No. 2 to the shift register 18, the second, third and fourth bits thereof are successively turned to high-level.

It is noted that the ignition signal for the cylinder No. 1 is used for identifying the cylinder, and since the ignition is effected cyclical, it is not necessarily needed.

The output signals 18a, 18b, 18c, and 18d from different bits of the shift register 18 are applied to the AND gates 19-No. 1, 19-No. 3, 19-No. 4, and 19-No. 2, respectively. Simultaneously, the output signals 18a, 18b, 18c, and 18d are applied as control signals to switches 17-No. 3, 17-No. 4, 17-No. 2, and 17-No. 1, respectively. The output signals are at the same time used as changeover signals for the aforesaid distributing switches 10f and 10g.

Since it is assumed now that the cylinder No. 1 is ignited, only the first bit of the shift register 18 is at high-level and only the AND gate 19-No. 1 is open. As described above, the knocking at the cylinder No. 1 is assumed to be strong, and the exclusive NOR circuit 15 produces a high-level output signal and the AND gates 20 are all open. Accordingly, the timing control pulse from the comparator 23 passes through the AND gate 19-No. 1 and the AND gate 20-No. 1 and then is applied to the up-down counter 16-No. 1. At this moment, the control signal from the AND gate 14 is at a high-level, as explained above, so that the up-down counter 16-No. 1 effects an up-count. If the preceding stored count of the up-down counter 16-No. 1 is assumed to be "retard angle level 1" (corresponding to one unit retard angle from the ignition reference signal and being a digital signal 0001 provided that the up-down counter is of 4-bit), the stored count will be modified by the operation to "retard angle level 2" (a digital signal 0010). Accordingly, the next ignition of the cylinder No. 1 will be retarded by an amount equivalent to two times the unit retard angle relative to the ignition reference signal.

On the other hand, contemporaneous to the aforesaid operation, the switch 17-No. 3 (consisting of the same number of switches as the number of bits of the up-down counter) is closed during the period when the output signal 18a from the shift register 18 is at high-level, for determining the ignition timing of the cylinder No. 3 which is ignited next to the cylinder No. 1. As a result, the stored count of the up-down counter 16-No. 3, e.g., a signal of "retard angle level 2" (that retard level signal for the cylinder No. 3 which has been determined at the preceding ignition of the cylinder No. 3 on the basis of the reference signals 11a-No. 3 and 11b-No. 3 as produced by the low-pass filter 10b from the noise level of the cylinder No. 3), is applied to the latch circuit 30.

The latch circuit 30 latches the digital signal when the aforesaid timing control pulse is applied thereto, and delivers it to a digital-analog converter 29. The output from the digital-analog converter 29 becomes a reference signal for comparison at the comparator 28. At the same time, the comparator 28 receives the output signal from the integrator 27 which integrates the aforesaid number of revolutions signal during the period when the flip-flop 26 is at high-level. The flip-flop 26 is set by the ignition reference signal from a distributor and reset by the output signal from the comparator 28.

Accordingly, the integrator 27 starts integration when the ignition reference signal is applied to the flip-flop 26 and terminates the integration when the integrated output thereof surpasses the comparison reference signal from the digital-analog converter 29 (under the present assumption, an analog voltage corresponding to twice the unit retard angle). In other words, the integration terminates when the output from the comparator 28 starts to rise. Here, the reason for integrating the number of revolutions signal is for converting the angle into time.

A monostable multivibrator 31 is triggered when the output signal from the comparator 28 starts to rise, and the output signal of the multivibrator 31 becomes an ignition control pulse applied to a driving circuit 32. The driving circuit 32 generates a high voltage by switching an ignition coil, for applying the high voltage to an ignition plug of the cylinder No. 3 through the distributor.

As a result, the ignition of the cylinder No. 3 is effected based on the stored count of the up-down counter 16-No. 3, which is "retard angle level 2" under the present assumption, namely the ignition takes place with a time delay from the ignition reference signal which time delay corresponds to a revolving angle twice the unit retard angle. The ignition control pulse from the monostable multivibrator 31 is also applied to the shift register 18, so that the shift register 18 now produces a high-level at the second bit alone.

Thereafter, the next "retard angle level" for the cylinder No. 3 is determined and held in a similar sequence to that of the cylinder No. 1, and at the same time, the ignition timing of the cylinder No. 4 is determined.

For the four cylinders, the determination of the knocking level and operation and the storing are successively effected in a manner similar to that as described above, so that the four ignitions form a main cycle, wherein the amount of modification of the ignition timing relative to the ignition reference signal is controlled based on the result of the preceding operation as stored in the up-down counters 16-No. 1, 16-No. 3, 16-No. 4, and 16-No. 2 for the four cylinders, or on the basis of the "retard angle level signals".

For instance, if the ignition with the "retard angle level 2" does not cause any knocking at the cylinder No. 3, a down count is made for providing a "retard angle level 1" for the next ignition. If the ignition of the cylinder No. 4 at a "retard angle level 0" (namely, igniting at the ignition reference signal) should cause no knocking, the next ignition is effected with the same "retard angle level 0" (application of a down-count signal cannot make the stored count fall below zero).

Besides, if ignition of the cylinder No. 2 with a "retard angle level 1" should result in a slight knocking, the next ignition is effected with the same "retard angle level 1" (as explained above, the exclusive NOR circuit 15 closes the AND gate 20 in this case, for cutting off the timing control pulse there).

In short, the state of knocking is measured or judged cylinder by cylinder based on the reference signals for each of the different cylinders as prepared from the noise level signals produced by the low-pass filters 10a through 10e corresponding to the individual cylinders, namely the high-level reference signals 11a-No. 1 through 11a-No. 4 and the low-level reference signals 11b-No. 1 through 11b-No. 4, and the ignition timing is optimized cylinder by cylinder based on the result of the measurement of the knocking state. Thus, the fuel cost and the output characteristics of an engine can be optimized even when there are dispersions in the conditions for causing knocking at different cylinders and the background noises thereof.

As described in the foregoing, the prior art has a shortcoming in that only a single voltage is provided for judging the knocking states of a number of cylinders and that when sensed signals from a sensor for different cylinders are dispersed due to the location of mounting the sensor or the like some cylinders may not be properly controlled. According to the present invention, proper reference signals for judging the knocking are provided cylinder by cylinder, so that the state of knocking can be accurately judged for each of the cylinders based on the reference signals.

Therefore, as described in the foregoing by referring to the illustrated embodiment, a device can be provided for controlling and modifying the ignition timing of each cylinder independently by variable amounts, so that the ignition timing of each cylinder can be properly controlled independently, and the fuel cost and the output characteristics of an engine can be improved.

What is claimed is:

1. A knock detecting device for a multiple cylinder engine, comprising:

a sensor for detecting vibrations of the body of the engine and producing output signals indicative thereof:

a plurality of averaging circuits, each of said averaging circuits corresponding to a separate one of said cylinders;

a first switch means for distributing output signals from said sensor developed in association with individual cylinders to said corresponding averaging circuits in synchronism with ignitions of said individual cylinders;

a second switch means for selecting output signals from said corresponding averaging circuits in synchronism with said ignitions thereby providing individual corresponding reference signals for each of said cylinders; and a detecting means for detecting a knocking state of each of said cylinders in dependence on said corresponding reference signal for each cylinder.

2. A knock detecting device as set forth in claim 1, wherein said device further comprises a means for controlling ignition timing of said cylinders based on output signals from said detecting means.

3. A knock detecting device as set forth in claim 2, wherein said control means includes a plurality of up-down counters, one of said up-down counters being associated with each of said individual cylinders.

4. A knock detecting device as set forth in claim 3 and further including means for incrementing said up-down counters and gating means for gating outputs from said incrementing means to each of said up-down counters individually, said gating means and said first and second switch means being responsive to a ring counter.

5. A knock detecting device as set forth in claim 1, wherein said device further comprises a voltage divider receiving said output signals from the corresponding averaging circuits and producing corresponding high-level and low-level reference signals for each of said individual cylinders, said detecting means comparing said output signals from said sensor developed in association with individual cylinders with said corresponding high-level and low-level reference signals.

6. A knock device as set forth in claim 5 wherein said device further comprises a peak detector adapted to detect and hold peak values of said output signals from said sensor for each of said cylinders, and said detecting means comparing said peak values against said corresponding high-level and low-level reference signals.

7. A knock detecting device as set forth in claim 1, wherein each of said averaging circuits is a low-pass filter having a resistor and a capacitor.

* * * * *